Oct. 5, 1965　　　　　G. DIETIKER　　　　　3,209,880
CARGO HANDLING APPARATUS
Filed July 10, 1964　　　　　　　　　　　2 Sheets-Sheet 1
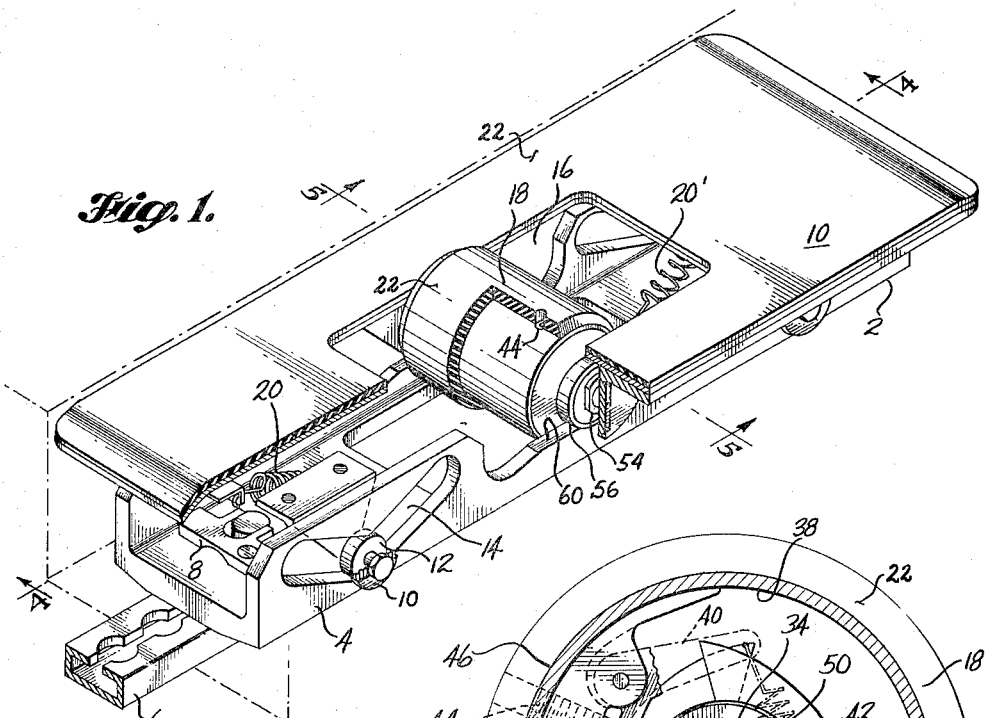
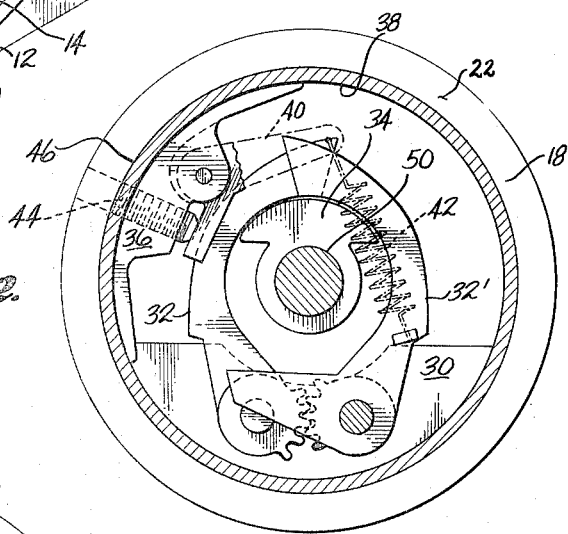
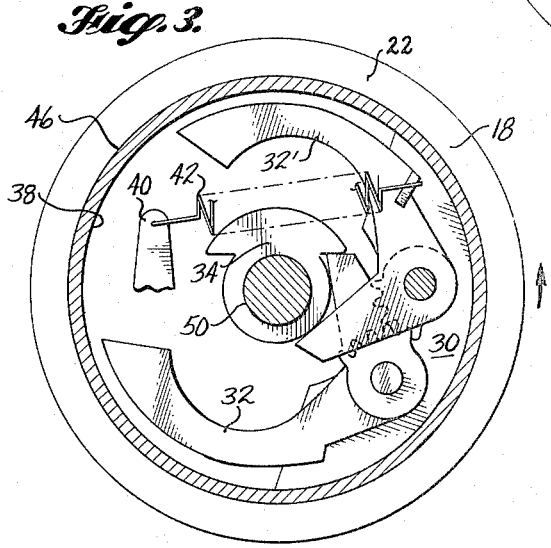
INVENTOR.
GILBERT DIETIKER
BY
AGENT Oct. 5, 1965  G. DIETIKER  3,209,880
CARGO HANDLING APPARATUS
Filed July 10, 1964  2 Sheets-Sheet 2

INVENTOR.
GILBERT DIETIKER
BY
AGENT

United States Patent Office 3,209,880
Patented Oct. 5, 1965

3,209,880
CARGO HANDLING APPARATUS
Gilbert Dietiker, Bellevue, Wash., assignor to The Boeing Company, Seattle, Wash., a corporation of Delaware
Filed July 10, 1964, Ser. No. 381,784
8 Claims. (Cl. 193—37)

This invention relates to cargo handling apparatus and more particularly to cargo roller devices with automatic braking mechanism for slowing down and/or stopping runaway cargo.

The present invention was conceived to improve cargo handling apparatus in aircraft, but obviously is usable in all types of commercial vehicles or cargo storing locations.

Cargo roller devices are used for moving cargo or pallets loaded with cargo in an easy and speedy manner; however, it sometimes happens, especially with heavy loads than an excessive moving speed is attained and maneuvering control of the cargo is lost which frequently results in serious damages to the surrounding objects as well as to the cargo itself.

In order to avoid this problem of high moving speeds, the rollers were provided with a built-in stopping mechanism operating on the principle of centrifugal force, which automatically at a certain speed stops the rotation of the roller. The stopped roller then will act as a brake against the movement of the pallet or cargo bottom surface; however, the braking forces are directly applied to the roller resulting in excessive stresses on the built-in stopping mechanism and wear on the roller surface by the friction of the cargo or cargo pallet.

For a better gripping action between the pallet or cargo, the rollers were provided with a rubber non-slip surface which engages against the pallet or cargo and thus, when the roller is prevented to rotate at a certain speed, the friction between the rubber roller surface and the cargo or pallet bottom is very severe because of the small braking area provided by only a small portion of the circumference of the rubber surface of the roller. This small surface is subjected to excessive wear and the rubber surface had to be replaced frequently because of the many flat worn places thereon which created a very inefficient roller.

The present invention overcomes the here above mentioned shortcomings of the prior art.

Accordingly it is an object of the present invention to provide a cargo roller with an automatic braking mechanism adapted to actuate a brake shoe for preventing further movement of the cargo load.

It is another object of the present invention to provide a cargo roller with an automatic braking mechanism which can be adjusted to the desired speed for activating its automatic braking action.

It is yet another object of the present invention to provide an automatic cargo pallet braking device which operates in the forward as well as in the backward direction.

Further objects and advantages of the present invention will become apparent from the following description in conjunction with the accompanying drawings in which:

FIGURE 1 is a perspective view of the cargo roller with automatic brake and wherein a portion of the braking shoe is omitted in order to show the construction details necessary for explaining the operation of this apparatus.

FIGURE 2 is a section view of the roller showing the automatic braking mechanism, and speed adjusting device in the unlocked position.

FIGURE 3 is a section view of the roller showing the automatic braking mechanism in its locked position.

Figure 4:
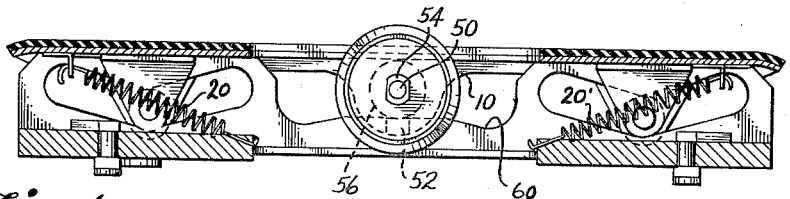
FIGURE 4 is a cross section taken from FIGURE 1 and showing the cargo roller in its normal operating position.

Generally, an automatic speed controlled cargo roller is provided for use in a floor recess. The roller has a built-in centrifugally operated mechanism, capable of stopping rotation of the roller when a predetermined speed is achieved, in which case, the stopped roller activates a brake shoe member to engage itself with the load, thereby preventing the load from further movement, and in so doing the stopped roller will then disengage itself from the load. A slight force moving the load in the direction opposite of its initial movement will simultaneously cause the brake shoe to be disengaged and the roller to become engaged with the load, thereby allowing the load to resume its original motion.

Referring now to FIGURE 1, the automatic cargo roller 2 is normally positioned in a floor recess and mounted with its frame 4, to a track 6 by mounting means 8. In an airplane, the automatic cargo roller 2 is not mounted in a recess, but rather on the seat track and on top of the floor as are the normal rollers. A brake shoe 10 is movably mounted on followers 12 which run in V-shaped slots 14, which are provided in frame 4. The brake shoe 10 is provided with an opening 16 in its center in which the roller 18 is slidably and rotationally mounted. Springs 20 and 20' are mounted between the brake shoe 10 and the frame 4, and provide a force for returning the brake shoe 10 into its nonbraking position. Both surfaces of the brake shoe 10 and the roller 18 are provided with a friction type of material 22 in order to provide a gripping action against a load.

A cross section of the roller 18 is shown in FIGURE 2, wherein a centrifugally operated mechanism 30 comprises two pivotably mounted balanced pawls, 32 and 32' carried by the roller 18 and geared to interact with one another and adapted to lock themselves with a cam member 34 when the roller 18 reaches a certain speed limit. A brake speed adjusting mechanism 36, is mounted on the inside surface 38 of the roller 18 and is provided with a lever 40 which has a spring 42 connected between the lever 40 and the pawl 32', with contraction force is capable of restraining the pawls 32 and 32', to move in a locked position with the cam member 34. An adjusting screw 44 is provided in the outside surface 46, of the roller 18 for setting the lever 40 of the brake speed adjusting mechanism 36.

FIGURE 3 illustrates the same cross section of the roller 18, as shown in FIGURE 2; however, the roller 18 is assumed to have reached a certain speed which activated the centrifugal mechanism 30, and thereby stopped the roller 18 in a locked position, as shown. It will be obvious as shown in FIGURE 3, that the direction of rotation as is indicated by the arrow produces a locking position between the pawl 32 and the cam member 34, but that a direction of rotation opposite of the shown arrow would also produce a locking position between the pawl 32' and the cam member 34, provided of course that in both instances the rotation speed of the roller 18 would have reached the predetermined velocity.

Figure 5:
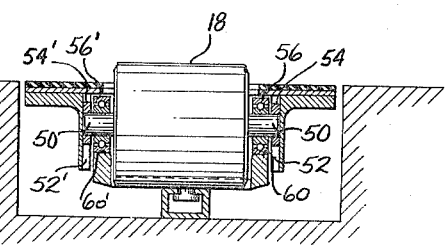
FIGURE 5 is a cross section taken from FIGURE 1 and showing in particular the bearing details of the roller.

FIGURE 4 and FIGURE 5 are primarily intended to show the unique slidable and rotational bearing mechanism between the roller axle 50 and the brake shoe 10.

The brake shoe 10 is provided with vertical slots 52 and 52′, facing the nonrotating axle 50 of the roller 18, and elongated members 54 and 54′, adapted to slide in the slots 52 and 52′ respectively, are fixedly mounted on the nonrotating roller axle 50. Discs 56 and 56′, having an innerrace fixedly mounted with the nonrotating axle 50 and an outerrace which functions as a cam follower, both discs 56 and 56′, are rotationally mounted on the roller axle 50 between the roller 18 and elongated members 54 and 54′ respectively, and are adapted to follow along the guiding edge 60 and 60′ respectively, which are provided in the frame 6. As is shown in FIGURE 5 a slidable arrangement for the roller 18 is thus provided on both sides of the axle 12. The roller 18 rotates about the nonrotating axle 50 on bearing means or the like which are not shown in order to keep the drawing details simple.

Figure 6:
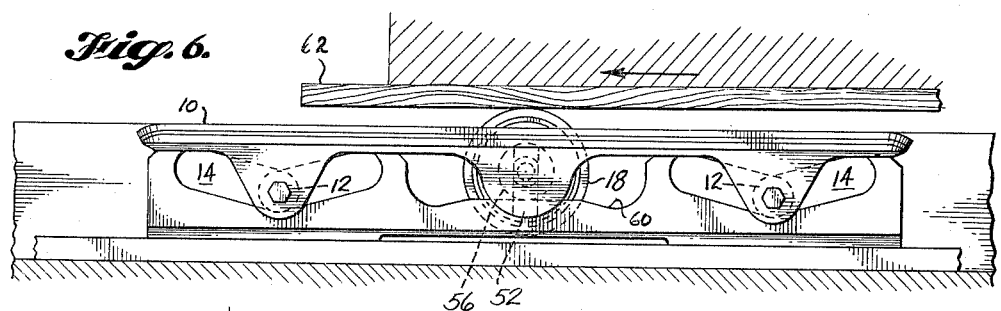
FIGURE 6 is a side view showing the roller in its normal operating position, with a load moving in the direction of the arrow.

In FIGURE 6 the pallet or cargo load 62 is shown to move on the roller 18 in the direction shown by the arrow. The roller 18 is engaged to the bottom of the pallet or cargo load 62 while the brake shoe member 10 is in its inactivated position, and is disengaged with the pallet or cargo load 62.

Figure 7:
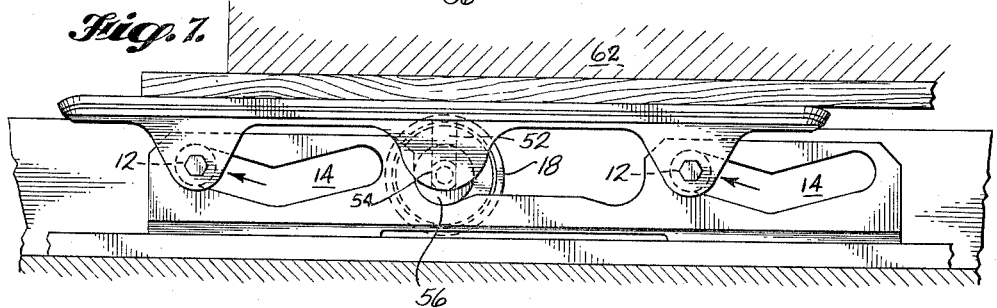
FIGURE 7 is a side view of the cargo roller wherein the braking action of the roller has activated the braking shoe and wherein the braking shoe is holding the load in a stopped position.

In FIGURE 7 an excessive speed was achieved by the cargo load which changed the position of the roller 18 as shown. The centrifugally operated mechanism 30 prevents further rotation of the roller 18, and caused the roller 18 to be moved in the direction shown by the arrow whereby the brake shoe 10 moved upwards and engaged itself against the pallet or cargo load 62, this upward movement was caused by the moving force from the pallet or cargo load 62 against the stopped roller 18, which in turn moved the brake shoe 10, through its followers 12 along the inclined portion of the V-shaped slots 14. The roller 18 was guided by its discs 56 and 56′, along the guiding edges 60 and 60′ respectively, and disengaged itself from the pallet or cargo load 62 as illustrated.

Having thus described the different parts and their function by reference numbers, the operation of the apparatus is as follows:

The cargo roller 2 with automatic braking mechanism is mounted in a floor recess by its mounting means 8 to a track 6 or by other means which would accomplish the same result.

The roller 18 will be slightly elevated above the floor level and the pallet or cargo load 62 is thus able to be moved with the least amount of friction and with easy maneuvering control.

Supposing that the pallet or cargo load 62 is moving at an undesirably fast speed, the roller 18 will then be prevented to rotate by its inside centrifugally operated mechanism 30. This mechanism 30 comprises two pawls 32 and 32′, which are weight balanced and provided with a geared section for interaction with one another, both pawls 32 and 32′, are pivotally mounted as shown in FIGURES 2 and 3 on the inside structure of the roller 18 and a fast rotation force of the roller 18 will tend to move the pawls 32 and 32′, and overcome the tension of spring 42, thereby allowing one of the pawls 32 or 32′, depending on the direction of rotation, to lock itself with the cam member 34. By adjusting the spring tension between the level 40 and the pawl 32′, by manually turning the adjusting screw 44, the desired speed limit at which the roller 18 should stop rotating can be set.

Assuming that the centrifugal mechanism 30 prevents the rotation of the roller 18 along its nonrotating axle 50, then the movement force of the pallet or cargo load 62 will move the roller 18 in the same direction. Thus the rotational movement of the roller 18 about axle 50, now changes into a translational movement of the roller 18 along its discs 56 and 56′, guided along the edge 60 and 60′ respectively, of the frame 4; however, the braking shoe 10 is slidably attached to the roller 18 by its elongated members 54 and 54′, in the vertical sliding slots 52 and 52′ respectively of the brake shoe 10, and thus, at the same time, that the roller 18 moves in a translational direction, the brake shoe 10 will move. The brake shoe 10 is movably mounted by its followers 12, in the V-shaped slots 14, provided in the frame 4 and thus the brake shoe 10 will move upwards along the inclined path formed by the slots 14, as shown in FIGURE 7. The brake shoe will now engage itself against the pallet or cargo load 62 while the roller 18 will disengage itself, because the guiding edge 60 in the frame 4 makes a dip and thus moves the roller 18 in a downward direction along its rotating discs 56 and 56′. The large surface area of the brake shoe 10 which is now engaged with the pallet or cargo load 62 will prevent further movement thereof.

In order to move the pallet or cargo load 62 so as to restore its prior traveling direction, it will be necessary to move the pallet or cargo load 62 slightly in the opposite direction of its prior movement thereby to overcome the small resistance which is provided by the dip of the contoured guiding edge 60 in the frame 4. The two springs 20 and 20′ as shown in FIGURES 1 and 4, which are mounted between the brake shoe 10 and the frame 4 will assist the brake shoe 10 to return to its original position and will also assist to bring the roller 18 back to its center position and engages itself against the pallet or cargo load 62. Thus the moving operation of the pallet or cargo load 62 can be reassumed.

In short, several important phases take place in this invention, first; the roller 18 rotates, second; the roller 18 is prevented to rotate, third; the stopped roller 18 is now moved in a horizontal direction parallel to the movement of the pallet or cargo load 62, and fourth; the roller 18 moves downward and disengages itself from the pallet or cargo load 62. At the same time that the roller was moving in the translational direction, the brake shoe 10 was moving in an upwards direction, and engaged itself with the pallet or cargo load 62 and prevents further movement thereof so that the pallet or cargo load 62 comes to a complete standstill.

Having thus described this invention it will be obvious that various other structural modifications may be contemplated by those skilled in the art without departing from the spirit and scope of the invention as hereinafter defined by the appended claims.

I claim:
1. A cargo roller apparatus having automatic braking means comprising in combination:
   (a) roller means having braking means therein for preventing rotation of said roller means at a certain rotational velocity of said roller means, and
   (b) brake shoe means disposed to be actuated by said roller means when rotation of said roller means is being prevented so that said brake shoe means will engage against, and said roller means will disengage from an associated cargo load.

2. A cargo roller apparatus having automatic braking means as claimed in claim 1 wherein said braking means is provided with brake velocity regulating means for setting the braking means so that a rotation of said roller means is prevented at a predetermined rotational velocity of said roller means.

3. A cargo roller apparatus having automatic braking mechanism for stopping runaway cargo loads comprising in combination:
   (a) a frame,
   (b) a brake shoe member movably mounted on said frame and adapted to stop runaway cargo load by frictionally engaging to the cargo load after being actuated,
   (c) a roller for conveying cargo, rotatably mounted on said brake shoe member, and
   (d) a brake mechanism mounted in said roller and disposed to stop rotation of said roller at a predetermined rotational speed,
   (e) said roller when stopped by said brake mechanism adapted to actuate said brake shoe member and in doing so said roller being capable of disengaging itself from the cargo load.

4. A cargo roller apparatus having an automatic braking mechanism therein, comprising in combination:
(a) an elongated U-shaped frame member having in each of its vertical sides guiding means,
(b) a brake shoe, slidably mounted on said frame member and guided along said guiding means in said vertical sides of said frame member,
(c) a roller having means to prevent the rotation of said roller at a certain speed and being mounted on said brake shoe in a slidable and rotational fashion,
(d) said roller adapted to actuate said brake shoe for moving in an inclined direction along said guiding means and said roller further adapted to move in a declined direction along said guiding means when said roller is prevented to rotate by said means to prevent rotation of said roller at a certain speed.

5. Apparatus for effecting movement of cargo comprising, in combination:
(a) a frame member having at least two vertical sides which function as guiding means,
(b) a brake shoe mounted on said frame member and disposed to be guided along said guiding means,
(c) a roller for engaging the cargo and having means to prevent the rotation of said roller at a certain rotational speed and being mounted on said brake shoe in a slidable and rotational fashion,
(d) said roller adapted to effect an actuation of said brake shoe when the rotation of said roller is prevented so as to push said brake shoe into engagement with the cargo and said roller further adapted to move along said guiding means and disengage from the cargo.

6. An automatic speed control cargo roller apparatus comprising, in combination:
(a) a brake shoe having an opening therein,
(b) a roller slidably and rotationally mounted on said brake shoe in said opening,
(c) a mechanism disposed inside of said roller capable of stopping said roller at a certain rotational speed,
(d) a frame member adapted to guide said roller in a translational direction and said braking shoe in an upwards direction,
(e) said roller, when stopped by said mechanism, adapted to move in said translational direction thereby activating said brake shoe to move in said upward direction.

7. An automatic speed controlled roller as claimed in claim 6, wherein said frame member is adapted to guide said roller in a downward direction after its translational direction is completed.

8. An automatic speed controlled roller as claimed in claim 6, wherein spring means are provided between said frame member and said brake shoe in order to aid in restoring the original position of said roller and said brake shoe prior to said prevention of rotation by said roller by said mechanism.

References Cited by the Examiner
UNITED STATES PATENTS

| | | | |
|---|---|---|---|
| 1,979,466 | 11/34 | Nedenskoog | 193—40 X |
| 2,618,370 | 11/52 | Orwin | 193—35 |
| 3,180,470 | 4/65 | Isacsson | 193—37 |

SAMUEL F. COLEMAN, *Primary Examiner.*